US012311821B2

(12) United States Patent
Borden

(10) Patent No.: US 12,311,821 B2
(45) Date of Patent: *May 27, 2025

(54) PROMOTIONAL VEHICLE WITH ADJUSTABLE SHOWROOM

(71) Applicant: Aardvark Studios, LLC, Conshohocken, PA (US)

(72) Inventor: Lawrence W. Borden, Conshohocken, PA (US)

(73) Assignee: Aardvark Studios, LLC, Conshohocken, PA (US)

(*) Notice: Subject to any disclaimer, the term of this patent is extended or adjusted under 35 U.S.C. 154(b) by 447 days.

This patent is subject to a terminal disclaimer.

(21) Appl. No.: 17/328,660

(22) Filed: May 24, 2021

(65) Prior Publication Data
US 2021/0276476 A1 Sep. 9, 2021

Related U.S. Application Data

(63) Continuation of application No. 16/246,900, filed on Jan. 14, 2019, now Pat. No. 11,014,484.

(51) Int. Cl.
B60P 3/025 (2006.01)
B62D 39/00 (2006.01)

(52) U.S. Cl.
CPC ............ B60P 3/0255 (2013.01); B62D 39/00 (2013.01)

(58) Field of Classification Search
CPC ....... B60P 3/025; B60P 3/0255; B60P 3/0257; B62D 39/00
USPC .......................................................... 296/21
See application file for complete search history.

(56) References Cited

U.S. PATENT DOCUMENTS

| 2,733,094 A * | 1/1956 | Carlton ..................... A47F 1/04 |
| | | 296/22 |
| 3,258,019 A | 6/1966 | Bellas |
| 3,308,845 A | 3/1967 | Bellas |
| 3,338,423 A | 8/1967 | Wellman, Jr. |
| 3,492,042 A | 1/1970 | Nachtigall, Jr. |
| 3,534,997 A | 10/1970 | Mitchell, Jr. |
| 3,620,564 A * | 11/1971 | Wenger ..................... E04H 3/28 |
| | | 160/19 |
| 3,670,718 A | 6/1972 | Brendgord |
| D230,351 S | 2/1974 | Hamel |
| 3,802,103 A | 4/1974 | Neff |

(Continued)

FOREIGN PATENT DOCUMENTS

| CA | 2369334 A1 | 8/2002 |
| CN | 201824993 U | 5/2011 |

(Continued)

OTHER PUBLICATIONS

Aardvark Event Logistics. "Look Book" Custom Marketing Vehicle Look Book. Printed Nov. 13, 2017. https://aardvarkmobiletours.com/look-book. 5 pages.

(Continued)

Primary Examiner — Gregory A Blankenship
(74) Attorney, Agent, or Firm — BLANK ROME LLP

(57) ABSTRACT

A vehicle has a first showroom enclosure at a first side of the vehicle body and a second showroom at an opposite side of the vehicle body. A storage area is provided between the first and second showroom and can be accessed by a door at the rear of the vehicle body, or at access panels located at the first and/or second sides of the vehicle body.

14 Claims, 4 Drawing Sheets

(56) References Cited

U.S. PATENT DOCUMENTS

| | | | |
|---|---|---|---|
| 4,019,773 A | 4/1977 | Vehling | |
| D246,360 S | 11/1977 | Hafer | |
| D247,290 S | 2/1978 | Arnot, Jr | |
| 4,232,488 A | 11/1980 | Hanley | |
| 4,270,319 A | 6/1981 | Spasojevic | |
| 4,601,509 A | 7/1986 | Ellis, Sr. | |
| 4,639,031 A | 1/1987 | Truckenbrodt | |
| D292,196 S | 10/1987 | Dooley | |
| D300,012 S | 2/1989 | Boice, Jr. | |
| 4,958,874 A | 9/1990 | Hegedus | |
| D314,164 S | 1/1991 | Barber | |
| 5,310,209 A | 5/1994 | Holman | |
| 5,375,899 A | 12/1994 | Wright | |
| 5,383,703 A | 1/1995 | Irvine, III | |
| D371,330 S | 7/1996 | Wright | |
| D371,527 S | 7/1996 | Wright | |
| 5,706,616 A | 1/1998 | Fernandez | |
| D400,124 S | 10/1998 | Mason | |
| 5,833,293 A | 11/1998 | Ludwig | |
| 5,833,294 A | 11/1998 | Williams | |
| 5,918,924 A | 7/1999 | Cowan | |
| D413,838 S | 9/1999 | McDaniel | |
| D426,493 S | 6/2000 | Mertins | |
| 6,182,795 B1 | 2/2001 | Boerer | |
| 6,189,244 B1* | 2/2001 | Johnson | E02F 5/14 405/181 |
| 6,585,305 B2 | 7/2003 | Nazginov et al. | |
| 6,686,305 B1 | 2/2004 | Beall | |
| D491,844 S | 6/2004 | Poulin | |
| 6,997,495 B1 | 2/2006 | Groezinger | |
| D533,115 S | 12/2006 | Delamour | |
| 7,198,313 B2 | 4/2007 | Baum | |
| D551,128 S * | 9/2007 | Renard | D12/102 |
| 7,287,349 B1 | 10/2007 | MacDonald et al. | |
| 7,364,050 B2 | 4/2008 | Guard | |
| 7,621,576 B2 | 11/2009 | Cote | |
| 7,942,461 B2* | 5/2011 | Cohen | G09F 21/048 296/21 |
| 7,950,728 B2* | 5/2011 | Plavetich | B60R 9/00 296/22 |
| D650,310 S | 12/2011 | Varotsos | |
| D652,353 S | 1/2012 | Cohen | |
| D653,993 S | 2/2012 | Cohen | |
| 8,141,304 B2 | 3/2012 | Shen | |
| D656,866 S | 4/2012 | Wise | |
| 8,220,854 B2 | 7/2012 | Cohen | |
| D678,823 S | 3/2013 | Cohen | |
| 8,387,856 B1 | 3/2013 | Lachance | |
| 8,485,285 B2 | 7/2013 | Ferrigni | |
| 8,506,301 B2 | 8/2013 | Jaszlics | |
| 8,636,208 B2 | 1/2014 | Urban | |
| D701,470 S | 3/2014 | Cohen | |
| D701,471 S | 3/2014 | Cohen | |
| 8,690,215 B2* | 4/2014 | Cohen | G09F 21/048 40/591 |
| 8,955,897 B1* | 2/2015 | Miller | B60P 3/14 296/24.32 |
| D736,675 S | 8/2015 | Cohen | |
| 9,458,621 B2 | 10/2016 | Calafatis | |
| 9,469,236 B2 | 10/2016 | Nicholson | |
| 9,481,283 B2 | 11/2016 | Cohen | |
| 9,520,012 B2* | 12/2016 | Stiernagle | G07F 11/165 |
| D782,938 S | 4/2017 | Cohen | |
| 9,700,761 B2 | 7/2017 | Beaver | |
| 9,750,999 B2 | 9/2017 | Monaco | |
| D809,430 S | 2/2018 | Orlovich | |
| 9,896,017 B1 | 2/2018 | Requejo | |
| D832,138 S * | 10/2018 | Cavalieri | D12/14 |
| 10,160,370 B2* | 12/2018 | Borden | B60P 3/0255 |
| 10,269,273 B1* | 4/2019 | Borden | E04B 1/34336 |
| D847,695 S | 5/2019 | Borden | |
| 10,339,514 B2* | 7/2019 | Natarajan | G06Q 20/202 |
| 10,874,117 B2* | 12/2020 | Tollefson | A23G 9/28 |
| 10,926,687 B2* | 2/2021 | Tadros | B60P 3/0255 |
| 10,980,247 B2* | 4/2021 | Tollefson | A23G 9/28 |
| 11,014,484 B1* | 5/2021 | Borden | B62D 39/00 |
| D926,084 S * | 7/2021 | Borden | D12/93 |
| 11,352,079 B1 | 6/2022 | Cash | |
| 11,707,160 B2* | 7/2023 | Klein | A47J 36/321 99/483 |
| D1,008,093 S | 12/2023 | Walöen | |
| D1,009,710 S | 1/2024 | Elsner | |
| D1,009,712 S | 1/2024 | Kamdron | |
| D1,010,514 S | 1/2024 | Elsner | |
| D1,010,515 S | 1/2024 | Leishman | |
| D1,015,205 S | 2/2024 | Stanners | |
| D1,024,850 S | 4/2024 | Borden | |
| D1,024,888 S | 4/2024 | Belcher | |
| D1,025,836 S | 5/2024 | Borden | |
| D1,028,794 S | 5/2024 | Wang | |
| D1,029,691 S | 6/2024 | Wisler | |
| D1,030,558 S | 6/2024 | Jin | |
| D1,035,491 S | 7/2024 | Lee | |
| 2002/0153747 A1* | 10/2002 | Ropp | B60P 3/14 296/24.45 |
| 2003/0038494 A1 | 2/2003 | Nazginov | |
| 2004/0256872 A1 | 12/2004 | Piper | |
| 2006/0248763 A1 | 11/2006 | Tarabella | |
| 2007/0156005 A1 | 7/2007 | Baum | |
| 2007/0290587 A1 | 12/2007 | Jeansonne | |
| 2008/0030427 A1 | 2/2008 | Lanham | |
| 2009/0019747 A1 | 1/2009 | Rosa | |
| 2009/0066106 A1 | 3/2009 | Liu | |
| 2009/0195008 A1 | 8/2009 | Braswell | |
| 2010/0036707 A1 | 2/2010 | Gilchrist | |
| 2010/0043264 A1 | 2/2010 | Johnson, Jr. | |
| 2010/0269419 A1 | 10/2010 | Gyory | |
| 2011/0313811 A1 | 12/2011 | Urban | |
| 2012/0255240 A1 | 10/2012 | Shen | |
| 2012/0303458 A1 | 11/2012 | Schuler, Jr. | |
| 2014/0157685 A1 | 6/2014 | Fagan | |
| 2015/0315776 A1 | 11/2015 | Duncan | |
| 2016/0128886 A1 | 5/2016 | Merino | |
| 2016/0159267 A1 | 6/2016 | Dixon | |
| 2017/0096091 A1 | 4/2017 | Johnson | |
| 2017/0158108 A1 | 6/2017 | Elbaz | |
| 2017/0232880 A1 | 8/2017 | Peterson | |
| 2018/0020823 A1 | 1/2018 | Holmes | |
| 2018/0186272 A1 | 7/2018 | Borden | |
| 2018/0272825 A1 | 9/2018 | Eagleton | |
| 2019/0251883 A1* | 8/2019 | Borden | B60P 3/0255 |
| 2020/0086805 A1 | 3/2020 | Strasser, Jr. | |
| 2021/0276476 A1* | 9/2021 | Borden | B62D 39/00 |
| 2022/0023118 A1 | 1/2022 | Borden | |
| 2022/0396193 A1* | 12/2022 | Gallery | B60R 16/033 |
| 2023/0150415 A1* | 5/2023 | Murphy | B62D 63/061 108/44 |

FOREIGN PATENT DOCUMENTS

| | | |
|---|---|---|
| CN | 210947910 | 7/2020 |
| CN | 111593909 A | 8/2020 |
| DE | 3446490 A1 | 9/1985 |
| DE | 19541655 A1 | 5/1996 |
| DE | 202016102009 U1 | 6/2016 |
| EM | 0020150240001 | 4/2012 |
| EP | 0009945 A1 | 4/1980 |
| EP | 0070563 A1 | 1/1983 |
| EP | 1234519 A2 | 8/2002 |
| EP | 1635312 A1 | 3/2006 |
| EP | 2446870 A2 | 5/2012 |
| EP | 3520759 A1 | 8/2019 |
| FR | 766934 A | 7/1934 |
| FR | 917441 A | 1/1947 |
| FR | 2904138 A1 | 1/2008 |
| GB | 652823 A | 5/1951 |
| GB | 2097341 A | 11/1982 |
| JP | 6900097 B1 | 7/2021 |
| KR | 200439760 Y1 | 5/2008 |
| KR | 20160011517 | 2/2016 |
| KR | 20160115172 A | 10/2016 |
| KR | 102161495 B1 | 10/2020 |
| WO | 2011105094 A1 | 9/2011 |

(56) References Cited

FOREIGN PATENT DOCUMENTS

| WO | 2011158736 A1 | 12/2011 |
| WO | 2011160167 A1 | 12/2011 |
| WO | 2013078162 A1 | 5/2013 |

OTHER PUBLICATIONS

The Aardy—100% Electric Promo Sampling Vehicle. Printed Nov. 9, 2017. Download from Facebook. 19 pages.

"To the Bookmobile! The Library on Wheels of Yesteryear." Oct. 8, 2013 printed Sep. 13, 2017. http://www.messynessychic.com/2013/10/08/to-the-bookmobile-the-library-on-wheels-of-yesteryear/ 14 pages.

Aardvark Mobile Tours Home Facebook https://www.facebook.com/mobiletours/photos/a.135812687238/10155435076532239/?type=3&theater Feb. 22, 2018 (Year: 2018).

Aardy Vehicle by Aardvark Event Logistics, All Above campaign, 2 pages, 2014.

Aardy Vehicle by Aardvark Event Logistics, Bare Escentuais campaign, 3 pages, 2010.

Aardy Vehicle by Aardvark Event Logistics, BlackBerry campaign, 2 pages, 2011.

Aardy Vehicle by Aardvark Event Logistics, Cellular South campaign, 1 page, 2009.

Aardy Vehicle by Aardvark Event Logistics, Disney campaign, 1 page, 2011.

Aardy Vehicle by Aardvark Event Logistics, Glade campaign, 4 pages, 2012.

Aardy Vehicle by Aardvark Event Logistics, Samsung campaign, 2 pages, 2016.

Aardy Vehicle by Aardvark Event Logistics, Subway campaign, 2 pages, 2012.

Aardy Vehicle by Aardvark Event Logistics, Verizon campaign, 3 pages, 2014.

Conshohocken, Published Jun. 4, 2020 [online], [retrieved on Jan. 20, 2023]. Retrieved from the Internet: https://www.bizjournals.com/philadelphia/news/2020/06/04/aardvark-mobile-health-conshohocken-covid-19.html (Year: 2020).

https://twitter.com/brian_rebello Posted Sep. 14, 2016 (Year: 2016).

https://www.aardvarkmobiletours.com/look-book/#! Retrieved Nov. 28, 2017 (Year: 2017).

https://www.facebook.com/mobiletours/photos/a.135812687238.109513.29817547238/10155116314087239/?type=3&theater Posted Oct. 23, 2017 (Year: 2017).

https://www.streamcompanies.com/portfolio-piece/aardvark-event-logistics/ Available Jan. 2017 (Year: 2017).

Machine Translation of KR10-2016-0115172, Jun. 14, 2017, http://engpat.kipris.or.kr/pmt/patent/patentRTT.jsp.

Roughneck mobile showroom—Two Point Zero https://news.cision.com/two-point-zero/i/roughneck-mobile-showroom, c1534112 Posted Aug. 21, 2014 (Year: 2014).

T Aardy Vehicle by Aardvark Event Logistics, T-Mobile campaign, 4 pages, 2015.

Wren Kitchens on X Our mobile showroom is getting comfy https://twitter.com/WrenKitchens/status/566179181667426304 Posted Feb. 13, 2015 (Year: 2015).

Mobile Public Toilets Bangkok. 2024. Alamy. https://www.alamy.com/mobile-public-toilets-bangkok-image65365925.htm.

Mobile Health Clinic drives care access. Feb. 24, 2022. Mayo Clinic. https://www.mayoclinichealthsystem.org/hometown-health/transforming-healthcare/mobile-health-clinic-drives-care-access.

This cute little electric truck is a mobile vaccine unit. Mar. 8, 2021. Fast Company. https://www.fastcompany.com/90611887/ this-cute-little-electric-truck-is-a-mobile-vaccine-unit.

\* cited by examiner

PROMOTIONAL VEHICLE WITH ADJUSTABLE SHOWROOM

RELATED APPLICATION

This application is a continuation of U.S. patent application Ser. No. 16/246,900, filed on Jan. 14, 2019, now U.S. Pat. No. 11,014,484. The entire content of that application is hereby incorporated by reference.

BACKGROUND OF THE INVENTION

Field of the Invention

The present invention relates to mobile showrooms and advertising systems. More particularly, the present invention relates to a mobile showroom and advertising vehicle.

Background of the Related Art

Over the years, various designs have been made for vehicles to be used for showrooms and advertising of products and/or services. For instance, U.S. Pat. No. 7,287,349 shows an advertising vehicle, U.S. Pat. No. 6,585,305 shows a showroom advertising vehicle, and U.S. Pat. No. 4,019,773 shows a showcase and advertising vehicle.

SUMMARY OF THE INVENTION

It is an object of the invention to provide one or more separate showroom enclosures on a truck body. It is a further object of the invention to provide a truck body having two showroom enclosures separated by a central storage area.

The invention can be a vehicle with a first showroom enclosure at a first side of the vehicle body and a second showroom at an opposite side of the vehicle body. A storage area is provided between the first and second showroom and can be accessed by a door at the rear of the vehicle body, or at access panels located at the first and/or second sides of the vehicle body.

These and other objects of the invention, as well as many of the intended advantages thereof, will become more readily apparent when reference is made to the following description, taken in conjunction with the accompanying drawings.

DETAILED DESCRIPTION OF THE PREFERRED EMBODIMENTS

Figure 1A:
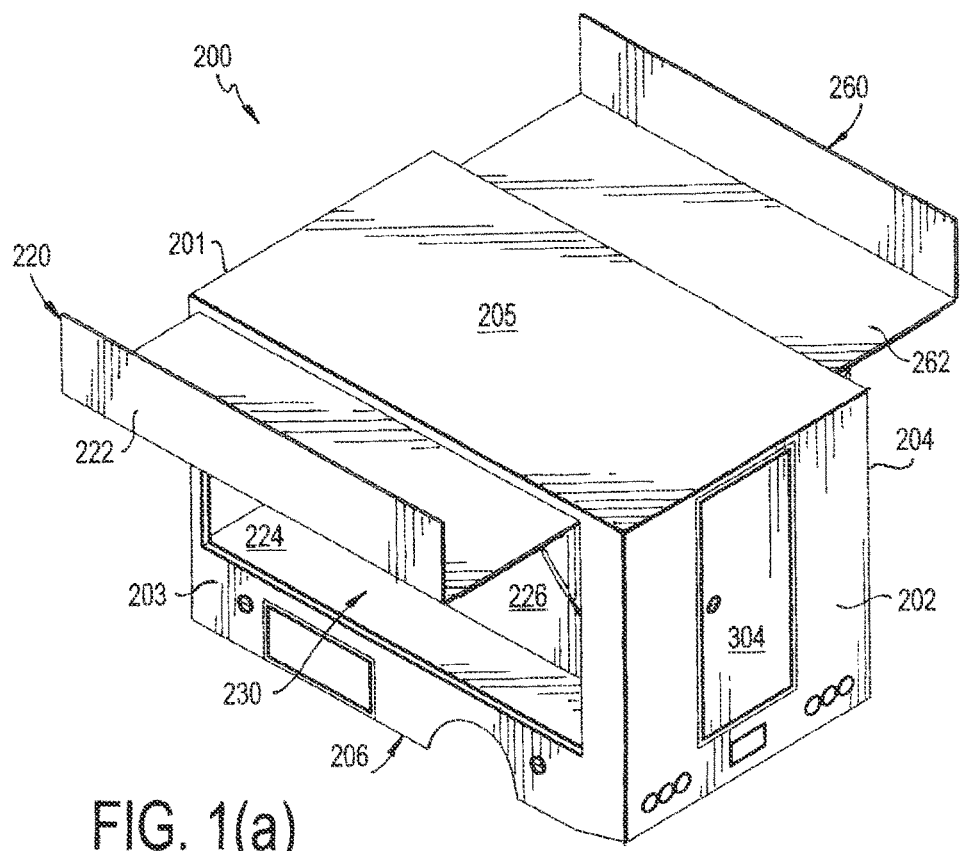
FIG. 1(a) is a perspective view of a truck body in accordance with a non-limiting example embodiment of the invention.

In describing an embodiment of the invention illustrated in the drawings, specific terminology will be resorted to for the sake of clarity. However, the invention is not intended to be limited to the specific terms so selected, and it is to be understood that each specific term includes all technical equivalents that operate in similar manner to accomplish a similar purpose. Several embodiments of the invention are described for illustrative purposes, it being understood that the invention may be embodied in other forms not specifically shown in the drawings.

Turning to the drawings, FIGS. 1-5 show a mobile advertising and/or showroom system 100 in accordance with an illustrative, non-limiting embodiment of the invention. Here, the system 100 is a vehicle 100 having a cab or chassis 102 and a truck body 200. The chassis 102 houses the motor and vehicle driver and passengers and is at the front of the vehicle 100. The truck body 200 is mobile and can be transported by the chassis 102. Thus, the truck body 200 includes wheels and other conventional transportation elements. The truck body 200 houses the showroom and advertising of the system 100.

The truck body 200 has an elongated rectangular or cuboid shape with a front or front side 201, rear or rear side 202, left side or driver side 203, a right side or passenger side 204, a top or top side 205, and a bottom or bottom side 206 that forms the floor. Each side 201-206 can be a thin flat wall or panel, but sufficient thickness and strength to form a wall of the truck body 200, and the bottom 206 can be even sturdier to support the weight of product and people inside the truck body 200. In addition, the sides 201-206 can be joined together in any suitable manner to form an interior space 300 and define an exterior. The left side, right side, top and bottom 203, 204, 205, 206 can have an elongated rectangular shape. The front, rear, left and right sides 201-204 are positioned substantially vertical, and the front and rear 201, 202 are substantially perpendicular to the left and right 203, 204. The top and bottom 205, 206 are positioned substantially horizontal and are substantially perpendicular to the front, rear, left and right sides 201, 202, 203, 204.

Figure 4:
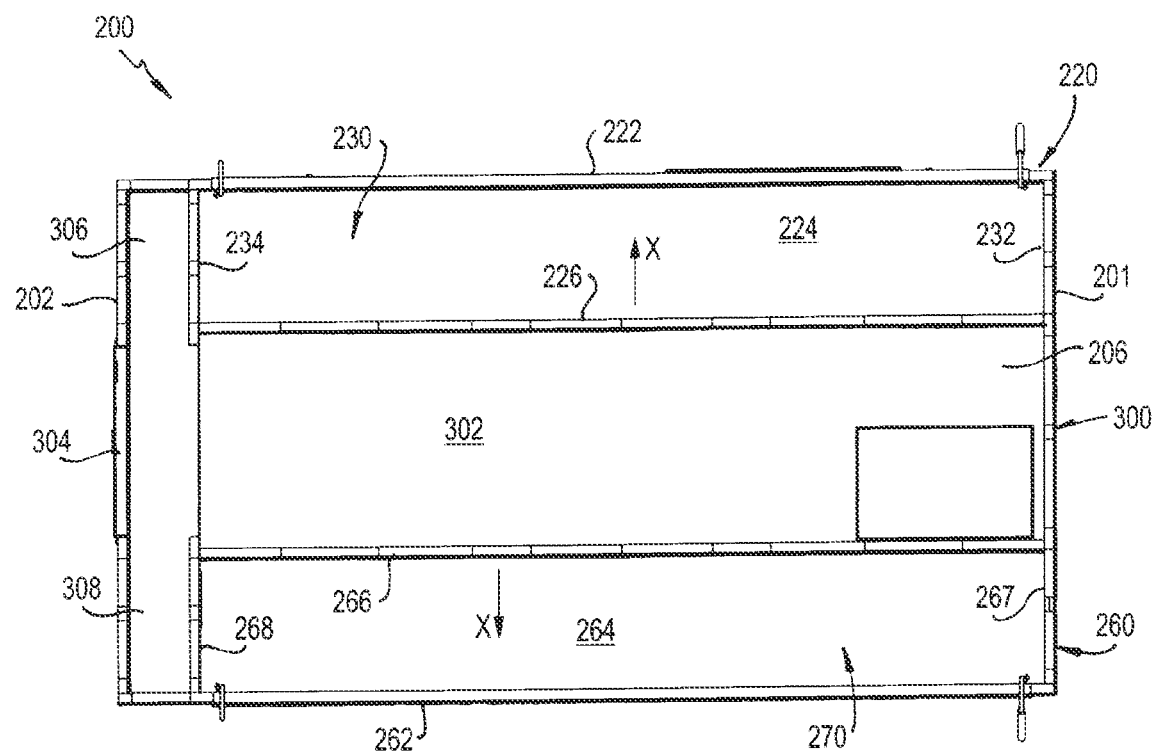
FIG. 4 is a top view of the truck body with the top removed to show the inside layout.
Figure 5:
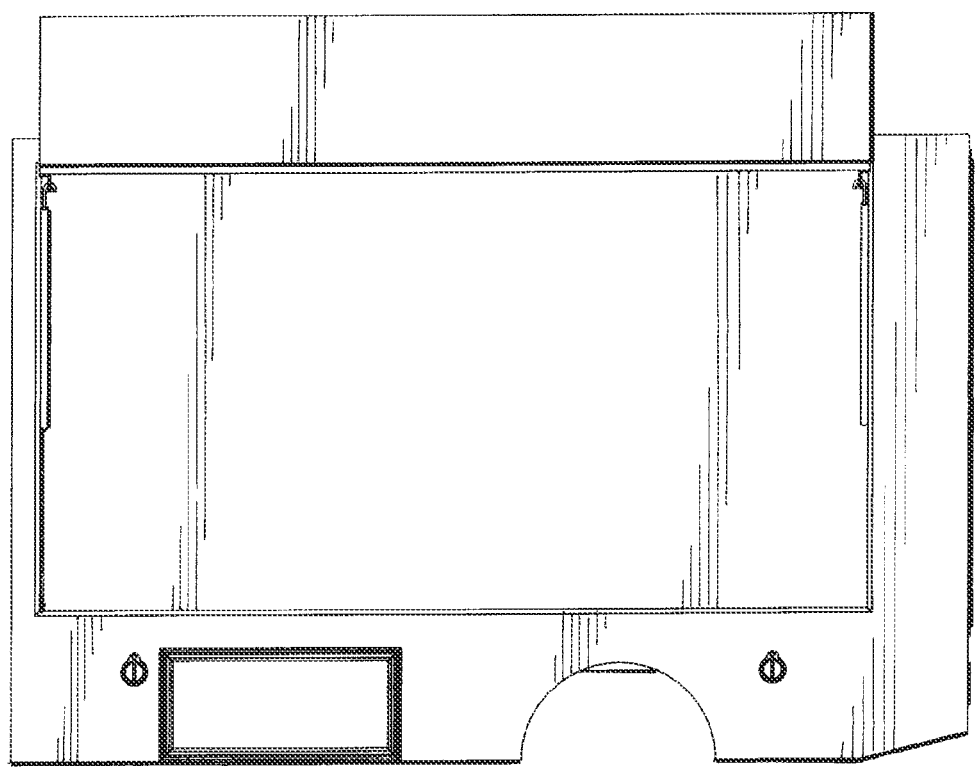
FIG. 5 is a side view of the truck body with the access panel in the opened position.

Referring to FIGS. 1(a), (b), the promotional vehicle 100 is shown in accordance with one embodiment of the present invention. The truck body 200 has a first showroom assembly 220 at the left (driver) side of the truck body 200, and a second showroom assembly 260 at the right (passenger) side of the truck body 200. As best shown in FIG. 4, each showroom assembly 220, 260 includes a respective showroom or showroom enclosure 230, 270 that is defined by the moveable showroom access panel 222, 262, an interior showroom back wall panel 226, 266, a showroom front wall side panel 227, 267, and a showroom rear wall side panel 228, 268, respectively. Thus, the truck body 200 has a first showroom 230 at the left side of the truck body 200, and a second showroom 270 at the right side of the truck body 200.

Each showroom also has a top formed by the top 205 of the truck body 200, and a bottom 224, 264. And, the back interior showroom walls 226, 266 extend the full width and height of the showrooms 230, 270. Moreover, the back interior showroom walls 226, 266 and the rear side showroom walls 228, 268 (as well as the truck body panels 201-204 and the access panels 222, 262) are substantially vertical, and the floor 206, top 205 and bottom 224, 264 are substantially horizontal. Thus, as shown, each showroom 230, 270 is a complete separate enclosure formed by the top, bottom 224, 264, and four walls, namely the back panel 226, 266, two side panels (front side panel 227, 267 and rear side panel 228, 268), and the access panels 222, 262. In addition, the rear panels 228, 268 are shorter than the truck body front and rear panels 201, 202 so that they only extend partly into the interior 300. Likewise, the showrooms 230, 270 only extend partly into the interior 300 and do not encompass the entire interior space 300 of the truck body 200.

Thus, the showrooms 230, 270 are completely separate from one another, so that a customer can only access one showroom 230, 270 at a time. Thus, a person accessing the first showroom 230 will not be able to see or touch product located in the second showroom 270, and vice versa. All of the top, bottom 224, 264 and four walls are a flat thin solid board.

The moveable showroom access panels 222, 262 are connected to the respective left- and right-side panels 203, 204 of the truck body 200. Thus, the moveable access panels 222, 262 do not make up the entire left- and right-side of the truck body, though in one embodiment the access panels 222, 262 can comprise the entire left- and right-side panels 203, 204, respectively. The access panels 222, 262 are a flat thin board and, as shown, can be formed by two or more separate pieces or members that are joined or connected together.

Figure 3:
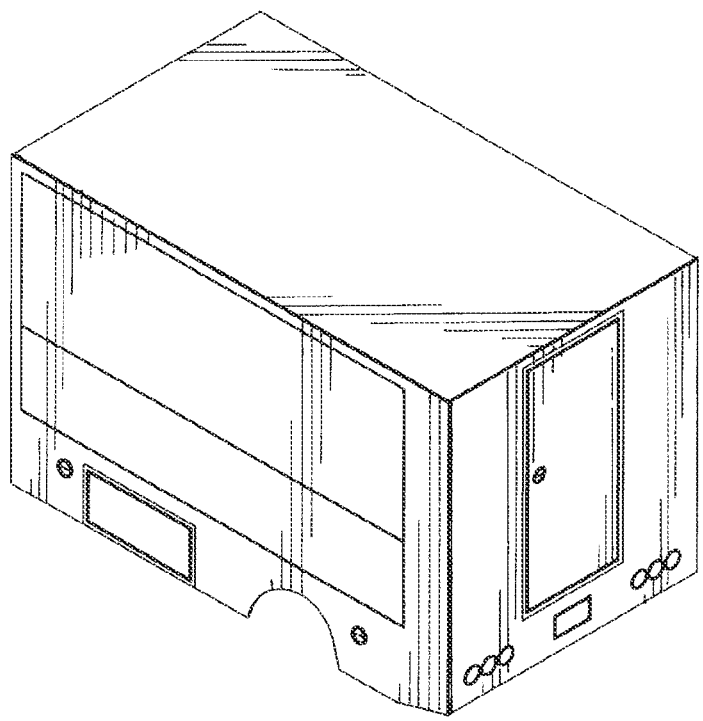
FIG. 3 is a perspective view of the truck body with the access panels in the closed position.

The showrooms 230, 270 form an interior display area in which product or display materials can be provided. The moveable panel 222, 262 can be moved between an open or raised position (FIGS. 1(*a*), (*c*), 2, 5), and a closed or lowered position (FIGS. 3, 4). In the closed position (FIGS. 3, 4), the showroom 230, 270 is blocked by the access panel 222, 262 and cannot be accessed. The closed position is especially suitable for travel, when the vehicle 100 is moving from one location to another. When the access panels 222, 262 are in the open position (FIGS. 1(*a*), 1(*c*), 2, 5), a user can access the respective showroom 230, 270 and product or materials located in the interior display area.

In addition, as best shown in FIG. 4, the back interior showroom walls 226, 266 can be located at different positions so that the showrooms 230, 270 can have different sizes. For example, the back walls 226, 266 can be moved outward in the direction of arrow X to create a smaller showroom 230, 270. Thus, the showrooms 230, 270 can be sized to match the amount and/or type of product to be provided in the showrooms 230, 270. In one embodiment of the invention, the back walls 226, 266 can be fixedly attached to the top, the bottom panel 224, 264, the front panel 201 and the rear showroom side wall 228, 268 (which in turn is fixedly coupled to the left- and right-panels 203, 204).

In yet another embodiment of the invention, the back interior wall 226, 266 can be adjustably and lockably mounted to the bottom panel 224, 264, the front panel 201 and the rear showroom side wall 228, 268. For example, one or more first mating adjustable coupling members can be provided in the top, the bottom panel 224, 264, the front panel 201, and/or the rear showroom side wall 228, 268. The back wall 226, 266 can have one or more second mating adjustable coupling members that align and slidably or adjustably mate with the coupling members.

The first adjustable coupling members can be, for example, a slide rail with a first locking member, and the second adjustable coupling members can be a slide rail with a second locking member that removably locks with the first locking member. The first locking member, for example, multiple openings at various positions along the length of the first coupling member, and the second locking member can be, for example, a protrusion or rod that extends into the openings and moves between a locked position and an unlocked position, and for example can be spring biased to the locked position. Still further, it will be recognized that not all of the top, bottom 224, 264, front 201, and rear wall 228, 268 need to have a first coupling member and not all of the first and second coupling members need to have a first and second locking member, respectively.

Thus, the back interior showroom walls 226, 266 can be located at various positions with respect to the side walls 203, 204 and the access panels 222, 262. That is, the back interior walls 226, 266 extend substantially parallel to the side walls 203, 204 and the access panels 222, 262, and can be moved inward/outward with respect to the side walls 203 and the access panels 222, 262 to define a desired size for the showroom 230, 270 and interior display area. The back interior walls 226, 266 can be slidably mounted and locked at the desired position. The front panel 201 and the rear side wall 228, 268 are substantially perpendicular to the back interior wall 226, 266.

Figure 1B:
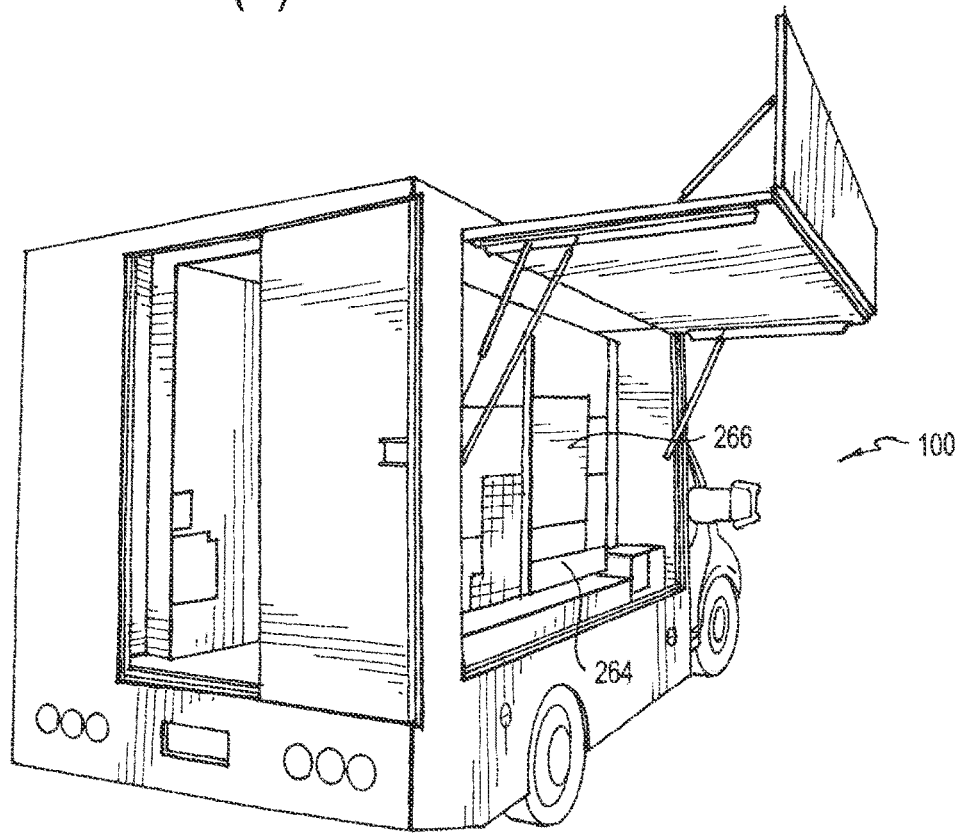
FIG. 1(b) is a rear perspective view of the invention of FIG. 1(a)
Figure 1C:
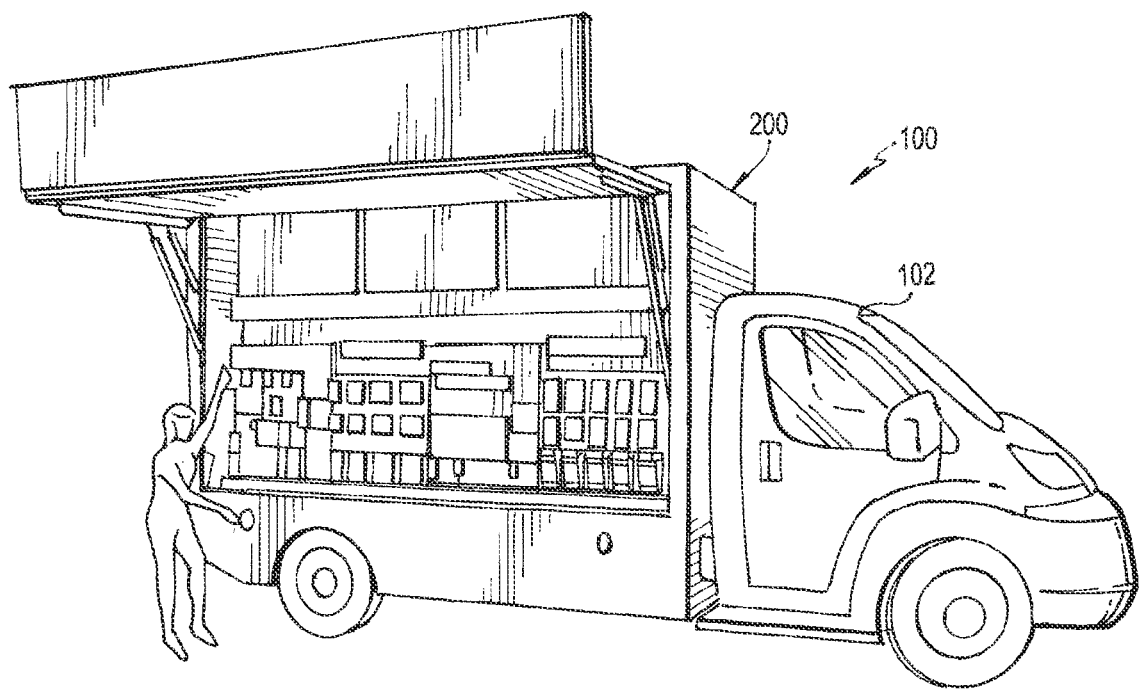
FIG. 1(c) is a side view of the vehicle.
Figure 2:
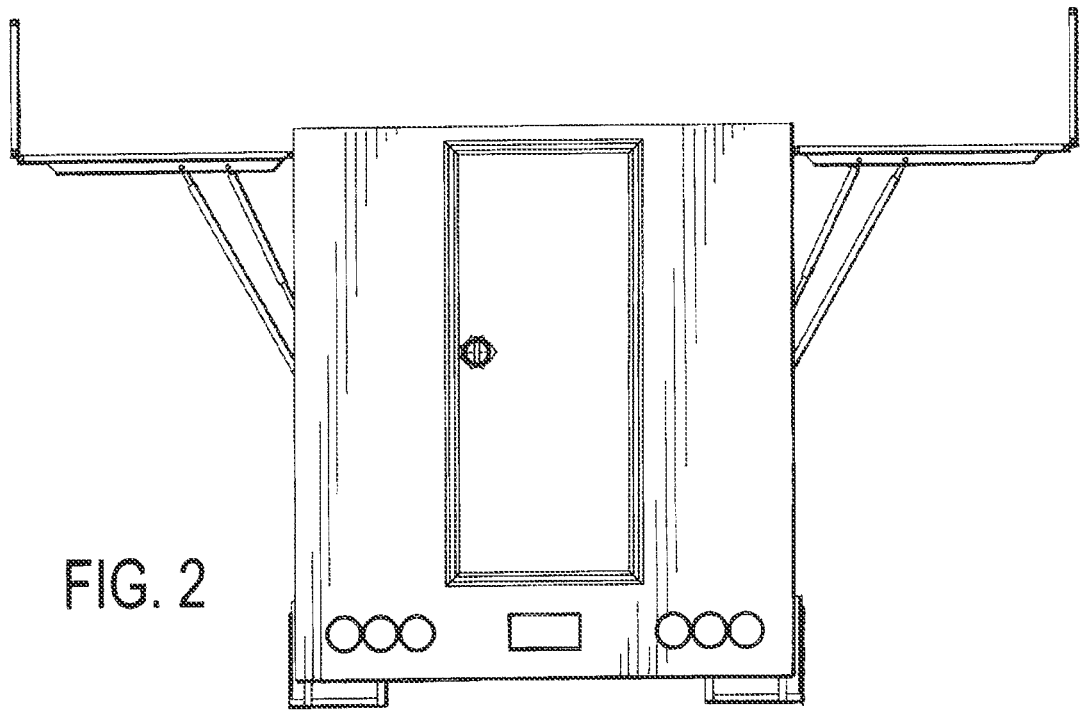
FIG. 2 is a rear view of the vehicle.

FIGS. 1(*b*), 1(*c*) illustrate the second showroom 270 having products and materials located in the interior display area. The products can be, for example, mobile phones and mobile phone accessories, and the materials can include, for example, display monitors such as televisions or computer terminals. The product and materials can be mounted to side walls, the interior back wall 226, 266, and/or mounted to or placed on the bottom 224, 264.

As best shown in FIG. 4, the truck body 200 has an interior space 300 that is defined by the front panel 201, side panels 203, 204, and the rear panel 202, as well as the floor 206 of the truck body 200 and the top of the truck body 200. That interior space 300 includes the first and second showrooms 230, 240, a central storage area 302, a left-side rear storage area portion 306 and a right-side rear area storage portion 308. The two showroom back walls 226, 266 define the central storage area 302, and side storage portions 306, 308, as well as the showrooms 230, 270. The central storage area 302 and side storage portions 306, 308 are separate from the showrooms 230, 270. Thus, product and material kept in the storage areas 302, 306, 308 cannot be seen or accessed by users, even while the user is accessing the first or second showrooms 230, 270. The storage areas 302, 306, 308 for a single continuous and complete enclosed areas formed by the interior back walls 226, 266, the rear side walls 228, 268, a portion of the front panel 201, and the rear panel 202.

Turning to FIGS. 1(*a*), 1(*b*), 2, 3, 4, the rear panel 202 of the truck body 200 is closed and does not open. However, a door 304 is provided in the rear panel 201. The door 304 can be opened and closed to permit a user to access the storage areas 302, 306, 308, which are located behind the showrooms 230, 270. The user can open the door and keep extra promotional product and material inside the storage areas 302, 306, 308 without interfering with other user's access and experience at the first and/or second showrooms 230, 270.

In the embodiments shown, it is noted that the back panel 226, 266 does not extend to floor 206 of the truck body 200. The back panels 226, 266 and the bottom panels 224, 264 are raised up off of the floor 206, to create additional storage below the bottom panels 224, 264. In addition, an access panel 310 (FIG. 1(*a*)) can be provided to allow a user to gain access to that storage space from the outside of the truck body side panels 203, 204. However, in other embodiments of the invention, the bottom panels 224, 264 can be comprised of the truck body floor 206 or attached directly thereto, and the back panels 226, 266 can extend to the floor 206, so that no added storage area is provided. Or, the access panels 310 can provide access to a limited portion (storage box) within the storage area or below the storage area (i.e., below the floor 206).

It is further noted that rear storage portions 306, 308 are provided by having separate rear showroom side walls 228, 268. The rear showroom side walls 228, 268 are spaced apart from the truck body rear panel 202 to form the storage spaces 306, 308. The rear storage spaces 306, 308 create a continuous wide storage area at the rear of the truck body 200 to fit wider materials. Access panels can also be provided to the sides of the door 304, the truck body rear panel 304 that open and close to enable wider access to that rear storage space 306, 308.

In yet another embodiment of the invention, the rear showroom side walls 228, 268 are optional and need not be provided. For example, the rear showroom side walls 228, 268 need not be separate members, as shown, but instead can be formed by a portion of the truck body rear panel 202. The rear interior walls 226, 266 can extend the entire length of the truck body 200 from the front panel 201 to the rear panel 202 so that the showroom rear side walls 228, 268 are formed by portions of the truck body rear panel 202, which would eliminate the storage side portions 306, 308. It is further noted that a front showroom side panel can be provided that is separate from the truck body front panel 201, to create a front storage area similar to the rear storage area 306, 308.

It is further noted that the adjustability of the interior rear showroom walls 226, 266 allows for additional storage area 302. For example, the interior rear showroom walls 226, 266 can be locked at the furthest outward position (in the direction of arrow X of FIG. 4) during travel, so that the central storage area 302 is at a wide position. Once the vehicle 100 has reached its desired location, product can be removed from the storage area 302 and the interior rear showroom walls 226, 266b can then be moved to the innermost adjustable position (in the direction opposite arrow X of FIG. 4), to form a larger showroom display area.

It is also noted that the showroom enclosures 230, 270 are at opposite sides of the truck body 200, namely the first showroom 230 is at the driver side 203 of the truck body and the second showroom 260 is at the passenger side 204 of the truck body. In addition, the storage area 302 is positioned between the first and second showroom enclosures 230, 270.

It is further noted that while a single showroom 230, 270 is shown at each side 203, 204 of the truck body 200, more than one showroom can be provided at each side 203, 204. In other embodiments, only a single showroom can be provided on the truck body 200, such that the first or second showroom 230, 270 is eliminated. In addition, the showroom(s) can be located at the rear panel 202 in addition to or instead of at the side panels 203, 204. In addition, the showrooms 230, 270 and showroom back panels 226, 266 are shown extending to an interior top 205 of the truck body 200, whereby the access panels 222, 262 are not connected at the very truck body top 205. In other embodiments, the top interior panel can be further spaced away from the truck body top 205, or can be at the truck body top 205.

It is further noted that the description and claims use several geometric or relational terms, such as parallel, perpendicular, and flat. In addition, the description and claims use several directional or positioning terms and the like, such as top, bottom, left, right, up, down, inward, outward, interior, and exterior. Those terms are merely for convenience to facilitate the description based on the embodiments shown in the figures. Those terms are not intended to limit the invention. Thus, it should be recognized that the invention can be described in other ways without those geometric, relational, directional or positioning terms. In addition, the geometric or relational terms may not be exact. For instance, walls may not be exactly perpendicular or parallel to one another but still be considered to be substantially perpendicular or parallel because of, for example, roughness of surfaces, tolerances allowed in manufacturing, etc. And, other suitable geometries and relationships can be provided without departing from the spirit and scope of the invention.

In the illustrative non-limiting embodiment of FIG. 4, the central storage space can be approximately 32-37 inches in width, the entire width of the truck body (and storage area 306, 308) can be about 84⅞ inches, the lengthwise width of the storage areas 306, 308 can be about 12⁵⁄₁₆ inches, the length of the showrooms 230, 260 (and back walls 226, 266) can be approximately 140.5 inches, and the transverse width of the showrooms 230, 260 can be about 22¹⁄₁₆ inches. The length of the truck can be about 144³⁄₁₆ inches, the height of the showrooms can be about 76.5 inches, the width of the truck body can be 88⁵⁄₁₆ inches, the length of the showrooms can be about 135 inches, and the height of the truck body can be approximately 106.5 inches. However, other suitable sizes can be provided, larger or smaller than those mentioned.

Within this specification, the various sizes, shapes and dimensions are approximate and exemplary to illustrate the scope of the invention and are not limiting. The sizes and the terms "substantially" and "approximately" mean plus or minus 15-20%, or in other embodiments plus or minus 10%, and in other embodiments plus or minus 5%, and plus or minus 1-2%. In addition, while specific dimensions, sizes and shapes may be provided in certain embodiments of the invention, those are simply to illustrate the scope of the invention and are not limiting. Thus, other dimensions, sizes and/or shapes can be utilized without departing from the spirit and scope of the invention.

Use of the term "optional" with respect to any element of a claim means that the element is required, or alternatively, the element is not required, both alternatives being within the scope of the claim. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

It is further noted that the invention is described for advertising and as a showroom. However, the invention can be utilized for any suitable purpose, such as transportation, sales, sampling activities (e.g., to sample coffee), and promotions. In addition, the invention includes the method or process or making and/or using the truck body 200.

It is still further noted that the invention has been shown and described as being a vehicle 100 having a separate cab 102 and truck body 200. The truck body 200 can be permanently affixed to the cab 102 or the truck body 200 can be separate and removably coupled with the truck cab 102 such as with a trailer. However, the cab 102 and truck body 200 can be formed integral with one another. For example, the cab 102 and truck body 102 need not be separate enclosures, but can share a wall. Thus, the rear of the cab 102 can be integral with the truck body front panel and can also have an opening so that a user can pass from the cab 102 into the truck body interior 300.

In one embodiment of the invention, the floor layout of the truck body can have different configurations. For example, the back interior panel 226, 266 can be more than one panel or can be stepped to define different transverse widths of the showrooms 230, 260.

Within this specification embodiments have been described in a way which enables a clear and concise specification to be written, but it is intended and will be appreciated that embodiments may be variously combined or separated without departing from spirit and scope of the invention. It will be appreciated that all features described herein are applicable to all aspects of the invention described herein. Each of the exemplary embodiments described above may be realized separately or in combination with other exemplary embodiments. The foregoing description and drawings should be considered as illustrative only of the principles of the invention. The invention may be configured in a variety of shapes and sizes and is not intended to be limited by the embodiment.

The foregoing description and drawings should be considered as illustrative only of the principles of the invention. The invention may be configured in a variety of shapes and sizes and is not intended to be limited by the preferred embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

The invention claimed is:

1. A vehicle comprising:
a body having one or more panels defining a space; and
a showroom located within the space, said showroom having at least one interior showroom panel defining a display area of said showroom, said at least one interior showroom panel movable between a first position defining a first showroom size, and a second position defining a second showroom size different than the first showroom size.

2. The vehicle of claim 1, said showroom further having a showroom front side panel, a showroom rear side panel, and a showroom access panel.

3. The vehicle of claim 2, wherein said showroom front side panel comprises a portion of said truck body front panel.

4. The vehicle of claim 2, wherein said showroom rear side panel comprises a portion of said truck body rear panel.

5. The vehicle of claim 2, wherein said showroom rear side panel comprises a separate panel than said truck body rear panel and is connected to said truck body left side panel or said truck body right side panel.

6. The vehicle of claim 2, wherein said at least one interior showroom panel is a showroom back interior panel, and said showroom back interior panel, showroom front side panel, showroom rear side panel and showroom access panel form a complete enclosure and said display area is contained within the complete enclosure.

7. The vehicle of claim 2, wherein said showroom access panel is movable between a closed position in which said display area cannot be accessed and an open position in which said display area can be accessed.

8. A vehicle body comprising:
one or more panels forming a space; and
a showroom enclosure contained within the space, said showroom enclosure having at least one vertical wall movable between a first position defining a first showroom size and a second position defining a second showroom size different than the first showroom size.

9. The truck body of claim 8, further comprising a storage area located within the space.

10. The truck body of claim 8, further comprising a storage access panel movable between an open position to grant access to the storage area and a closed position to block access to the storage area.

11. A vehicle body comprising:
one or more panels defining a space;
a showroom having walls defining a display area, said four walls including a first wall comprising an access panel movable between an open position that grants access to said display area and a closed position that denies access to said display area, and a second wall movable between a first position defining a first showroom size, and a second position defining a second showroom size different than the first showroom size.

12. The truck body of claim 11, wherein said second wall comprises a back interior wall.

13. The truck body of claim 12, wherein said back interior wall is at a rear of said showroom opposite said first wall in the closed position.

14. The truck body of claim 11, further comprising a storage area located within the space, said back interior showroom panel separating said showroom from a storage area.

* * * * *